US007761269B1

United States Patent
(12) United States Patent
Kraal et al.

(10) Patent No.: US 7,761,269 B1
(45) Date of Patent: Jul. 20, 2010

(54) SYSTEM AND METHOD OF SUBJECTIVE EVALUATION OF A VEHICLE DESIGN WITHIN A VIRTUAL ENVIRONMENT USING A VIRTUAL REALITY

(75) Inventors: Juliet C. Kraal, Ann Arbor, MI (US); Daniel Arbitter, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2791 days.

(21) Appl. No.: 09/630,918

(22) Filed: Aug. 2, 2000

Related U.S. Application Data

(60) Provisional application No. 60/197,183, filed on Apr. 14, 2000.

(51) Int. Cl.

| | |
|---|---|
| ***G06F 9/44*** | (2006.01) |
| ***G06F 17/50*** | (2006.01) |
| *G06F 9/445* | (2006.01) |

(52) U.S. Cl. .................. 703/8; 703/1; 703/17; 703/20; 703/26

(58) Field of Classification Search .................... 703/8, 703/1, 17, 20, 26, 27; 382/154; 342/365; 426/237; 345/737, 751, 758, 782, 733–734, 345/103; 463/36

See application file for complete search history.

(56) References Cited

U.S. PATENT DOCUMENTS 4,821,214 A 4/1989 Sederberg
4,882,692 A 11/1989 Saxton et al. ............... 345/661
5,119,309 A 6/1992 Cavendish et al. .......... 700/182
5,179,644 A 1/1993 Chiyokura et al.
5,197,120 A 3/1993 Saxton et al. ............... 345/661
5,253,331 A 10/1993 Lorenzen et al.
5,293,479 A 3/1994 Quintero et al. ............. 345/841
5,459,382 A 10/1995 Jacobus et al. ......... 318/568.11
5,504,845 A 4/1996 Vecchione
5,583,526 A 12/1996 Socks et al. .................... 345/8
5,631,861 A * 5/1997 Kramer ......................... 703/7
5,731,816 A 3/1998 Stewart et al.

(Continued)

FOREIGN PATENT DOCUMENTS

GB 2 333 383 7/1999 ................ 604/275

(Continued)

OTHER PUBLICATIONS

Juran On Quality by Design, by J.M. Juran, The Free Press, 1992, ISBN 0-02916683-7, pp. 406-427, and 462-467.*

(Continued)

*Primary Examiner*—Albert Decady
*Assistant Examiner*—Thomas H Stevens
(74) *Attorney, Agent, or Firm*—Gary A. Smith; Bliss McGlynn, P.C.

(57) ABSTRACT

A system for subjective evaluation of a vehicle design within a virtual environment includes a scaleable physical property representative of the vehicle design and a computer system for digitally creating a virtual environment having a virtual human immersed within. The system also includes a motion capture system for sensing a motion of an evaluator and communicating the sensed motion of the evaluator to the computer system and a virtual reality display mechanism for providing the evaluator a view of the virtual environment while evaluating the vehicle design.

19 Claims, 5 Drawing Sheets

U.S. PATENT DOCUMENTS

| | | | | |
|---|---|---|---|---|
| 5,792,031 | A * | 8/1998 | Alton | 482/78 |
| 5,793,382 | A * | 8/1998 | Yerazunis et al. | 345/474 |
| 5,799,293 | A | 8/1998 | Kaepp | 706/45 |
| 5,831,584 | A * | 11/1998 | Socks et al. | 345/8 |
| 5,846,086 | A * | 12/1998 | Bizzi et al. | 434/247 |
| 5,903,458 | A | 5/1999 | Stewart et al. | |
| 5,921,780 | A * | 7/1999 | Myers | 434/69 |
| 5,930,155 | A * | 7/1999 | Tohi et al. | 703/8 |
| 5,963,891 | A * | 10/1999 | Walker et al. | 702/150 |
| 5,999,187 | A | 12/1999 | Dehmlow et al. | |
| 6,036,345 | A * | 3/2000 | Jannette et al. | 700/97 |
| 6,084,590 | A * | 7/2000 | Robotham et al. | 345/419 |
| 6,090,148 | A | 7/2000 | Weber et al. | 703/8 |
| 6,096,086 | A | 8/2000 | Weber et al. | 703/8 |
| 6,096,087 | A | 8/2000 | Weber et al. | 703/8 |
| 6,110,216 | A | 8/2000 | Weber et al. | 703/8 |
| 6,113,643 | A | 9/2000 | Weber et al. | 703/8 |
| 6,113,644 | A | 9/2000 | Weber et al. | 703/8 |
| 6,253,167 | B1 * | 6/2001 | Matsuda et al. | 703/11 |
| 6,262,738 | B1 * | 7/2001 | Gibson et al. | 345/419 |
| 2002/0140633 | A1 * | 10/2002 | Rafii et al. | 345/8 |
| 2003/0134676 | A1 * | 7/2003 | Kang | 463/36 |

FOREIGN PATENT DOCUMENTS

| | | |
|---|---|---|
| GB | 2362551 A | 11/2001 |
| JP | 7-271289 | 10/1995 |

OTHER PUBLICATIONS

RAMSIS-The Human Touch to Technology. p. 1-3. http://www.human-solutions.com/prudukkte_ramsis_e.php (1997).*

Purschke-F et al. "Virtual Reality-New Methods for Improving and Accelerating the Development Process in Vehicle Styling and Design" IEEE document via Computer Graphics International Jun. 1998. p. 1-11.*

Smid et al., "Human Integration in Simulation" IEEE 1998 p. 554-558.*

Purschke-F. "Virtual Reality-New Methods for Improving and Accelerating the Development Process in Vehicle Styling and Design" (1998). IEEE Computer Graphics International p. 1-11.*

Nayar-N. "DENEB/ERGO—A Simulation-based Human Factros Tool" 1995 Proceedings of the Winter Simulation Conference. p. 427-431.*

Donald-D. A Tutorial on Ergonomic and Process Modeling Using Quest and IGRIP. 1998 Proceedings of the 1998 Winter Simulation Conference. p. 297-302.*

Motor Vehicle Dimensions,—SAE J1100 Jun. 1993, pp. 34.119-34.157, SAE Recommended Practice.

8th IEEE International Workshop on Robot and Human Interaction, Roman '99, '1999, Niesen, M.R.; Luecke, G.R. "Virtual Dynamic Prototyping For Operator Interface Design", pp. 357-361.

"Interactive Graphics Package For Human Engineering And Layout Of Vehicle Workspace", Gerald F. Rabideau and James Farnady, Department of Systems Design, University of Waterloo, Waterlloo, Ontario, Canada, 1976.

"Simulation-Aided Design of Man/Machine Interfaces in Automated Industries", Gary I. Davis and James R. Buck, School of Industrial Engineering, Purdue University, West Lafayette, Indiana, 1981.

"Rapid: Prototyping Control Panel Interfaces", Karl Freburger, OOPSLA '87 Proceedings, Oct. 4-8, 1987.

Chen et al., "A Real-Time, Interactive Method for Fast Modification of Large-Scale CAE mesh Models" 2000. p. 1-8.

Chen et al. IMF 1.0 User Manual Project No. AJ499 Ford Research Laboratory Oct. 26, 1999. p. 1-14.

* cited by examiner

SYSTEM AND METHOD OF SUBJECTIVE EVALUATION OF A VEHICLE DESIGN WITHIN A VIRTUAL ENVIRONMENT USING A VIRTUAL REALITY

This application claims all benefits of priority in U.S. Provisional Patent Application Ser. No. 60/197,183 filed Apr. 14, 2000.

BACKGROUND OF THE INVENTION

1. Field of the Invention

The present invention relates generally to vehicle design and, more specifically, to a system and method of subjective evaluation of a vehicle design within a virtual environment using virtual reality.

2. Description of the Related Art

Vehicle design, and in particular the design of an automotive vehicle, has advanced to a state in which computer based design techniques are frequently incorporated in the development of a new vehicle, or redesign of an existing vehicle. Computer based design techniques are especially beneficial in designing and packaging the various systems incorporated within the vehicle, to maximize the design and functional capabilities of these vehicle systems. Advantageously, potential vehicle system designs can be considered in a timely and cost-effective manner using a digital representation of a proposed design, versus preparing an actual vehicle model.

One aspect of the design task for a vehicle system, such as the instrument panel, is to ensure that the design of the vehicle system meets subjective and objective occupant compartment criteria for aesthetics and human factors. Objective criteria include packaging and fit of a system or component within the vehicle. However, to fully meet or exceed a consumer's expectations of a vehicle, subjective criteria, including comfort, convenience, visibility and accessibility are considered.

In the past, various methods have been utilized to determine whether a proposed design meets such criteria. For example, a proposed design may be analyzed in two dimensions, which requires many iterations of a drawing. A three-dimensional physical model, also referred to as a mockup, may be constructed to obtain a better perspective of the design. The mockup may be subjected to testing to determine whether it complies with objective and subjective criteria. For example, subjective criteria can be evaluated by positioning an evaluator within the mockup and having the evaluator respond to predetermined questions concerning the comfort and feel of various aspects of the mockup. This design method is time consuming and expensive, since it requires a physical model and evaluators from a target population.

It is also known to utilize virtual reality technology in conjunction with a digital mockup of a vehicle design to evaluate a proposed design. Virtual reality technology enables an evaluator to view an image of a virtual environment from a virtual human's perspective, and function within the virtual environment. Virtual reality also includes the personal immersion of the evaluator in the virtual environment, so that the evaluator can experience the virtual environment. The use of virtual reality technology in conjunction with a digital mockup of a vehicle design enhances the quality, robustness, reliability and cost-effectiveness of the design.

An example of the use of virtual reality technology in the design of a vehicle is disclosed in U.S. Pat. No. 5,831,584 to Socks et al, entitled "Hand Calibration System and Virtual Display Selection For Vehicle Simulator". Another example of the use of virtual reality technology in vehicle design is disclosed in U.S. Pat. No. 5,583,526 to Socks et al, entitled "Hand Calibration System For Virtual Reality Vehicle Simulator."

While both of the above referenced virtual reality vehicle simulators work well, only an eye and hand of the evaluator is immersed within the virtual environment. Therefore, the use of such a virtual reality vehicle simulator is limited to studies involving an evaluator's hand and view. Also, since only a portion of the evaluator is immersed in the virtual environment, the evaluator is physiologically less connected to the virtual environment than if the rest of their body was present. Thus, there is a need in the art for a system and method of subjective evaluation of a vehicle design that immerses a digital occupant into a virtual vehicle environment, so that the evaluator can subjectively assess the vehicle from their own perspective, or from a scaled perspective of a member of a target population.

SUMMARY OF THE INVENTION

Accordingly, the present invention is a system of subjective evaluation of a vehicle design within a virtual environment using virtual reality. The system includes a scaleable physical property representative of the vehicle design, such that the physical property is adjusted according to a scale ratio for an evaluator of the vehicle design. The system also includes a computer system for digitally creating a virtual environment having a virtual human immersed within. The system further includes a motion capture system for sensing a motion of the evaluator and communicating the sensed motion of the evaluator to the computer system and a virtual reality display mechanism operatively communicating with the computer system, for providing the evaluator a view of the virtual environment while evaluating the vehicle design.

Also, the present invention is a method of subjective evaluation of a vehicle design within a virtual environment using virtual reality. The method includes the steps of preparing an evaluator of a vehicle design for immersion as a virtual human in the virtual environment and determining a scale ratio for the evaluator. The method also includes the steps of preparing an adjustable property using the vehicle design and the scale ratio. The method further includes the steps of growing the virtual human within the virtual environment to virtually represent a scaled evaluator, and aligning the virtual human in the virtual environment with the evaluator and the property. The method still further includes the steps of performing the evaluation of the vehicle design by the evaluator and using the evaluation of the vehicle design in the design of the vehicle.

One advantage of the present invention is that a system and method of subjective evaluation of a vehicle design within a virtual environment is provided that utilizes virtual reality technology in the design of a vehicle to study subjective aspects of consumer and vehicle interaction, without building an actual prototype. Another advantage of the present invention is that the system and method personally immerses a digital human representing the full-body of an evaluator into a virtual vehicle environment. Still another advantage of the present invention is that the system and method scales the size of the evaluator in the virtual vehicle environment, so the evaluator can understand how another member of the target population perceives the vehicle design. Still yet another advantage of the present invention is that the system and method uses an adjustable prop representative of the vehicle design and capable of simulating a scaled perspective. Yet another advantage of the present invention is that the system and method provides for real time measurement and creation of a digital human using motion capture sensors. Yet still another advantage of the present invention is that the system and method provides for an interactive environment for personally immersive study and evaluation of the vehicle design by members of a design team. Yet a further advantage of the present invention is that the system and method integrates the use of a virtual human, a digital mock-up, a physical evaluator and a physical prop.

Other features and advantages of the present invention will be readily appreciated, as the same becomes better understood after reading the subsequent description taken in conjunction with the accompanying drawings.

DESCRIPTION OF THE PREFERRED EMBODIMENT(S)

Figure 1:
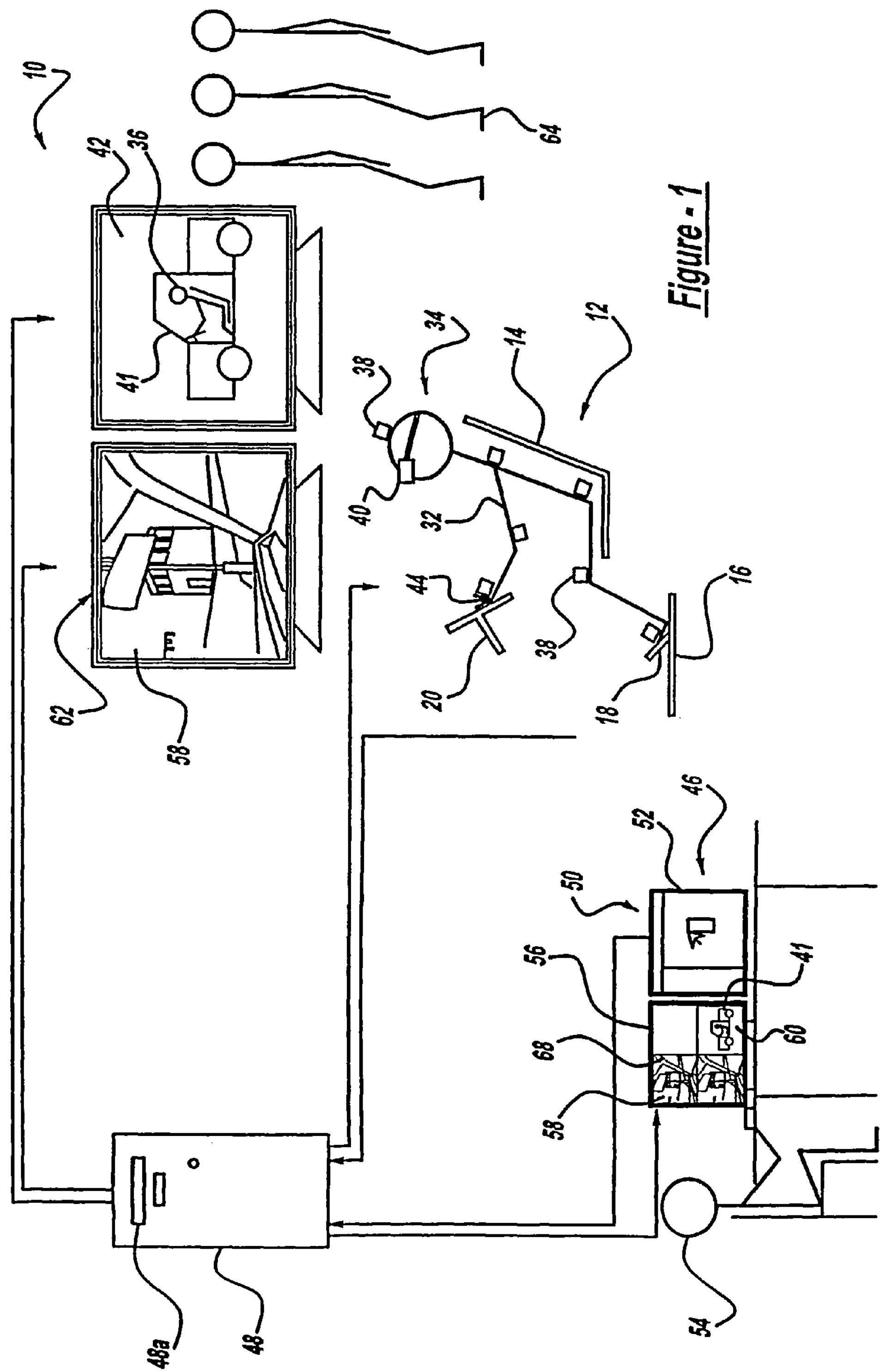
FIG. 1 is a block diagram of a system for subjective evaluation of a vehicle design within a virtual environment, according to the present invention.

Referring to FIG. 1, one embodiment of a system 10, according to the present invention, for subjective evaluation of a vehicle design by immersing a digital occupant within a virtual environment is illustrated. Advantageously, the system 10 can be utilized to evaluate a vehicle design based on a consumer's perception of ergonomic factors such as visibility, reach and clearance, early in the design process.

The system 10 includes an adjustable physical property 12 or prop that simulates the vehicle design being evaluated. In this example, the adjustable prop 12 includes a seat 14, a floor 16, a foot control 18, and a steering wheel 20. Key reference points from the vehicle design are utilized to position the seat 14, floor 16, foot control 18 and steering wheel 20 to simulate the vehicle design. The seat 14 can accommodate a seated occupant 24.

Figure 4:
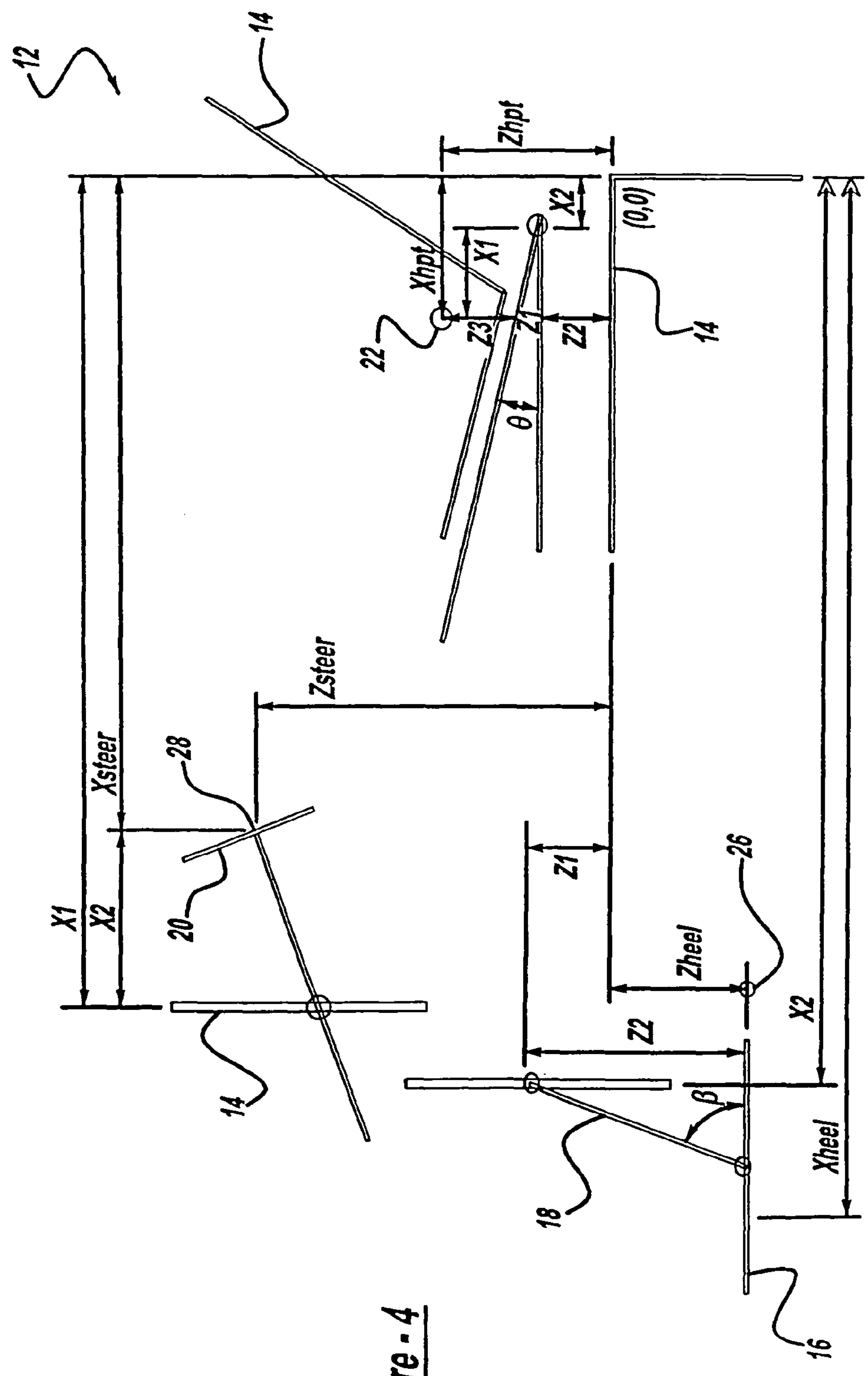
FIG. 4 is a block diagram of a physical prop for the system of FIG. 1.

Referring to FIG. 4, an example of a key reference point for representing a particular vehicle design is illustrated for the prop 12. An H-point, shown at 22, which is representative of a position of a pivot center of a torso and thigh of a drafting template used in defining a seat 14. Another reference point is a heel point, as shown at 26. The heel point 26 is a fixed position of a manikin heel (not shown) of the seated occupant 24 on the floor 16 of the vehicle, relative to the H-point 22. It should be appreciated that the H-point 22 and heel point 26 are used in locating a position of a foot control 18. Still another reference point is the steering wheel position, as shown at 28. The position of the steering wheel 28 is dependent on the hip point 22 and a location of a dash panel (not shown).

Advantageously, the adjustable prop 12 can be modified to represent various vehicle design configurations. Also, the adjustable prop 12 can be modified to simulate a scaled perspective in a manner to be described. Thus, a seated occupant 24 representative of a large male seated within the prop 12 experiences the prop 12 from the perspective of another member of the population, such as a small female.

Referring now to FIG. 1, the system 10 also includes a physical human or evaluator 32. In this example, the evaluator 32 is seated in the adjustable prop 12 while participating in a study to be described. The evaluator 32 can perform the study as themself, or scaled to represent a different member of a target population, in a manner to be described.

The system 10 includes a motion capture system 34 strategically positioned on the evaluator 32 to sense the movement of the evaluator 32. Motion capture is also used to operate a virtual human 36 in real time. The accuracy and precision of a digital occupant study depends on the virtual human 36, to be described, mirroring the movements of the evaluator 32. The reflection of the evaluator's movements is a component of the personally immersive experience, which also increases the fidelity of the simulation and the evaluator's confidence in the study.

The motion capture system 34 includes a motion capture sensor 38, such as a magnetic spatial tracker. Various factors influence the strategic placement of the motion sensors on the evaluator 32 including comfort to the wearer, reproducible sensor locations and a reproducible evaluator posture. In this example, eleven motion sensors are strategically positioned on the evaluator 32 to track the evaluator's movements. For example, motion capture sensors 38 are located on the evaluator's foot, above a knee, lower back, upper back, above an elbow, on a back of the hand and above a head. It should be appreciated that the same ergonomic landmarks should be used in positioning the motion capture sensors 38 on each evaluator, to ensure the accuracy of the evaluation. It should also be appreciated that the motion capture sensors 38 are in communication with a computer system 46, to be described, to provide motion capture sensor positions and orientations, in a manner to be described.

The motion capture system 34 further includes an instrumented glove 44, as is known in the art, that captures the motion of the evaluator's hand. An example of an instrumental glove 44 is Cybergloves by Virtual Technologies, Inc. The instrumented glove 44 is operatively in communication with the computer system 46, in a manner to be described.

The system 10 also includes a virtual reality display system 40, such as a head mounted display mechanism, known in the art. The virtual reality display mechanism 40 is worn by the evaluator 32, and allows the evaluator 32 to "see" a virtual environment 42 through the eyes of the virtual human 36. An example of a virtual reality display mechanism 40 is PUGO by Kaiser Electro Optics. The virtual reality display mechanism 40 is in communication with the computer system 46, and provides the evaluator 32 a view through the virtual human's eyes, or a first person view of the virtual environment 42.

The system 10 includes a computer system 46, as is known in the art, to implement a method, to be described, of subjective evaluation of a vehicle design using virtual reality within a virtual environment 42. The computer system 46 includes a processor 48 having a memory **48*a* to process information relevant to the evaluation of the vehicle design. The computer system 46 includes a display device 50**, such as a video terminal, to display information regarding the evaluation. It should be appreciated that, in this example, a plurality of video terminals are utilized to display information.

For example, a first video terminal 52 provides a display of information regarding the evaluation, such as instructions to control the study. A user 54 inputs information into the computer system 46 when prompted to do so. Selection and control of the information within a screen can be achieved by the user 54, via a user interactive device, such as a keyboard or mouse. The set of parameters or the set of instructions may be specific to the evaluation, wherein other data and information non-specific to the evaluation may already be stored in the memory of the computer system. One example of an input method is a pop-up dialog box containing available information or instructions. For example, information may be representative of a scale for the evaluator 32, or different vehicle design alternatives.

The computer system 46 also includes a second video terminal 56 that displays information regarding the evaluation, such as a first person view 58 of the virtual environment 42 or a third person view 60 of the virtual human 36 within the virtual environment 42. Advantageously, these views 58, 60 can be displayed on one screen or in a series of screens.

The computer system 46 also includes a remote video terminal 62 that allows observers, such as a design team 64 responsible for the vehicle design, to view the evaluation. In this example, there are two remote video terminals 62, one provides a first person view 58 of the evaluation and the other provides a third person view 60 of the evaluation. Advantageously, the design team 64 can actively participate in the evaluation to better understand and analyze the data generated by the evaluation. For example, the design team 64 can watch for an interference between the virtual human 36 and a portion of a digital vehicle 41 within the virtual environment 42 while the evaluator 32 executes an instruction.

The computer system 46 utilizes the set of information or instructions from the user 54 and any other information in carrying out a method 70, according to the present invention and discussed in detail subsequently, of subjective evaluation of a vehicle design within a virtual environment.

Advantageously, the computer implemented method 70 of subjective evaluation of a vehicle design using virtual reality combines all of the foregoing to provide an efficient, flexible, rapid tool for subjectively evaluating the design of a vehicle from a consumer's perspective. Furthermore, data obtained during the subjective evaluation of the design is an output of the method 70 and is available for further analysis and study.

Figure 2:
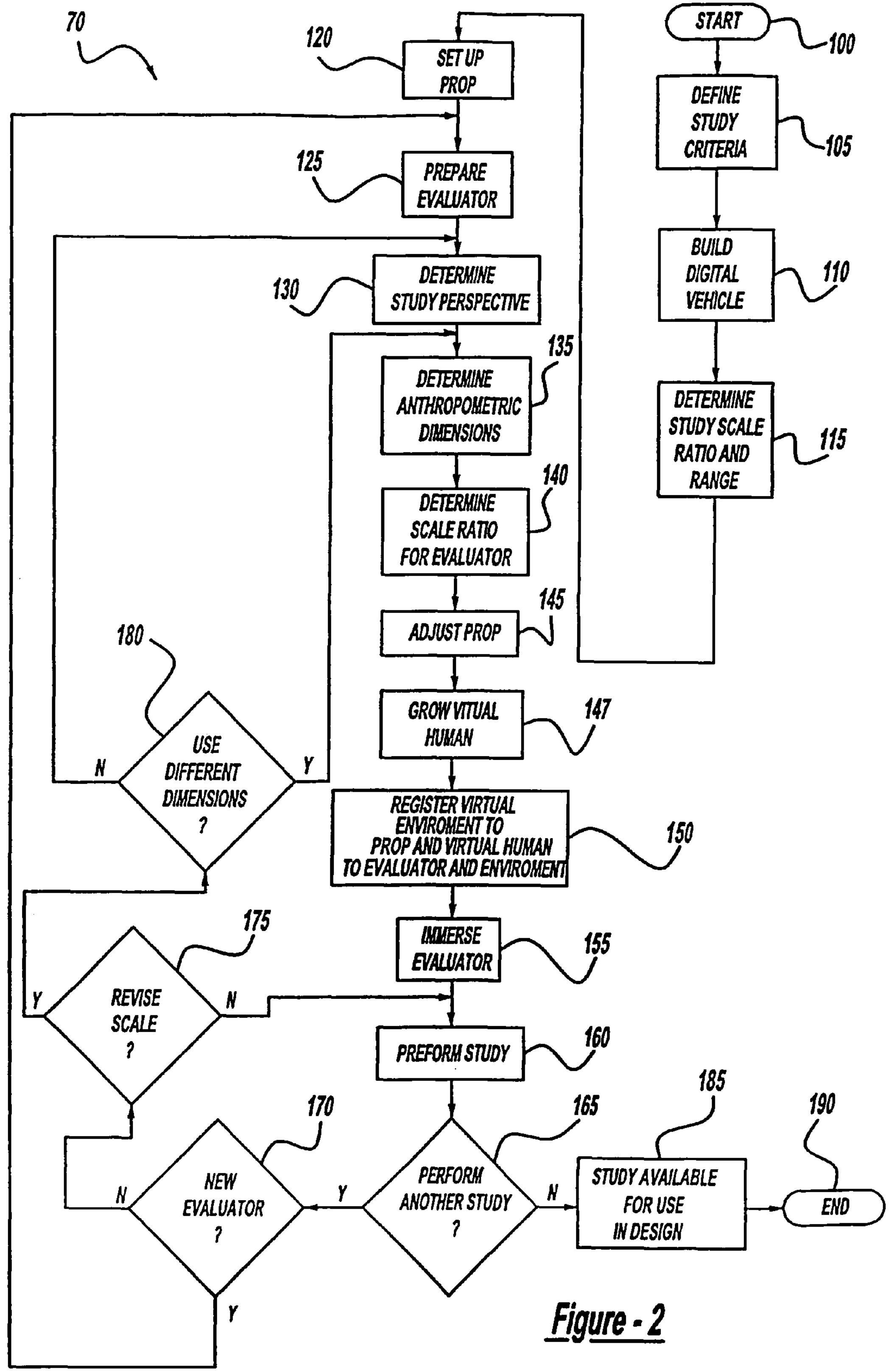
FIG. 2 is a flowchart of a method of subjective evaluation of a vehicle design within a virtual environment, according to the present invention, for the system of FIG. 1.

Referring to FIG. 2, a method 70 according to the present invention, of subjective evaluation of a vehicle design using virtual reality is illustrated. The evaluator 32 immersed in a virtual environment expects the same visual feedback from the virtual environment as in the physical environment. Therefore, the method 70 provides for personal immersion of the evaluator 32 into a virtual environment 42 that includes a full-body, real time dynamic digital representation of the individual being immersed. The method begins in block 100 and continues to block 105.

In block 105, the design team 64 prepares a subjective evaluation of the vehicle design, including criteria for performing the evaluation. It should be appreciated that the subjective evaluation may be in the form of a questionnaire for an evaluator 32 that is administered while the evaluator 32 is immersed in the virtual environment 42. An example of a subjective evaluation is an ergonomic evaluation of the placement of controls within a reach zone. Still another example of a subjective evaluation is vehicle driver visibility around an "A" pillar of the vehicle. An example of a subjective question is, "Is a radio control accessible?"; or "Is a foot control 18 position comfortable?". An example of an evaluation criteria is a target population to study, or a consumer perspective to study. The methodology advances to block 110 and continues.

In block 110, the design team 64 builds a digital vehicle 41 and a virtual environment 42 for carrying out the evaluation, preferably using the computer system 46. For example, the digital vehicle can be a new vehicle design or a new system therein, generated by a design tool known in the art as computer-aided design. Similarly, an existing computer-aided design of a vehicle stored in a computer database can be utilized. Preferably, the virtual environment is created in a similar manner. The methodology advances to block 115.

In block 115, the design team 64 determines a scale ratio and range of a target population represented in the evaluation, to ensure that the prop 12 has sufficient adjustability. Preferably, the target population represents a specific group of consumers within a particular population. It should be appreciated that a predetermined anthropometric dimension for the target population represented in the evaluation is known, and a maximum and minimum scale ratio and range is established for the target population. For example, the design team 64 may determine key anthropometric dimensions for a vision study, including seated eye height. The design team 64 then determines a target population to study, such as small females 5'4" tall. Then, using the available group of evaluators 32, and anthropometric dimensions, the max/min scale ratio is established to ensure sufficient adjustability in the prop. 12. The methodology advances to block 120.

In block 120, the prop 12 is adjusted to be representative of the same dimensional relationships as the digital vehicle design for the evaluation. For example, the prop's seat 14 and steering wheel 20 have the same geometric relationship as the digital vehicle. The prop 12 is also checked to determine if there is sufficient range to adjust the prop 12 based on the maximum and minimum scale ratio of the target population, for a scaled study. The methodology advances to block 125.

In block 125, the design team 64 prepares the evaluator 32 for real time, interactive, personally immersive participation in the evaluation. Advantageously, it is not necessary that the evaluator 32 be a member of a target population, as will be described with regards to a scale perspective. For example, motion capture sensors 38 are positioned on the evaluator 32 at reproducible locations, as previously described for the motion capture system 34. In this example, the evaluator 32 is also fitted with the head mounted display mechanism 40 for visual immersion and instrumented gloves 44 for real time interaction of the evaluator's hands. The method advances to block 130 and continues.

In block 130, a scale perspective for the evaluator 32 is selected by the design team 64 for the evaluation. Advantageously, a scaled perspective allows the evaluator 32 to understand the perception of the digital vehicle 41 from the perspective of an individual of a different size and shape. In this example, the scale perspective lets the evaluator 32 understand the perception of the digital vehicle 41 from the point of view of a member of the target population.

Figure 3A:
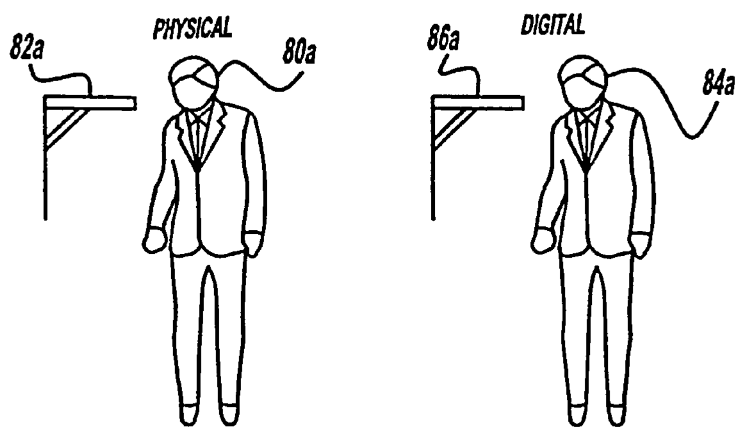
FIGS. 3A through 3D are block diagrams illustrating a scale perspective between a physical world and a virtual world.
Figure 3B:
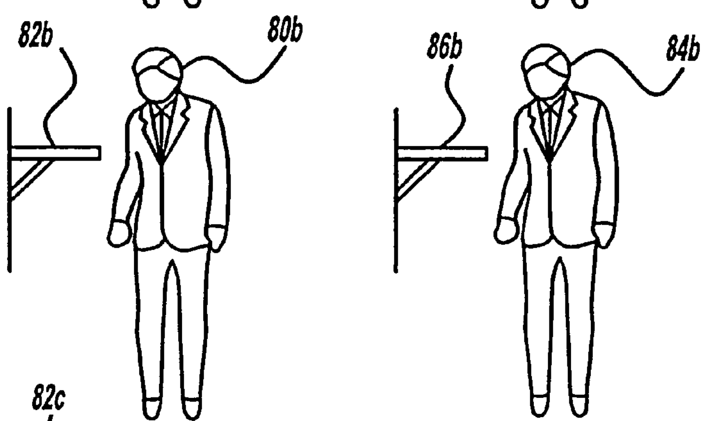
Figure 3C:
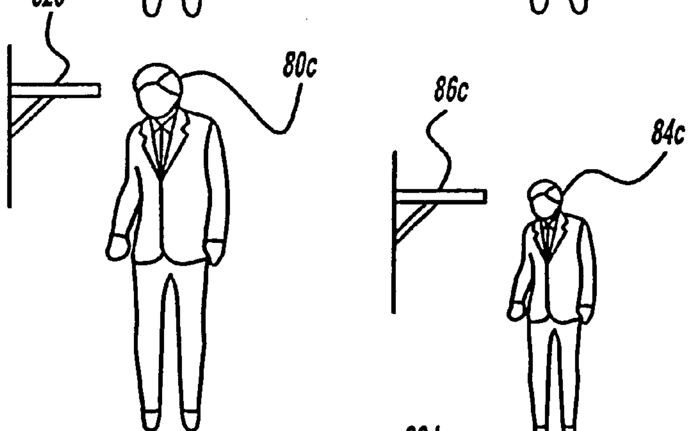
Figure 3D:
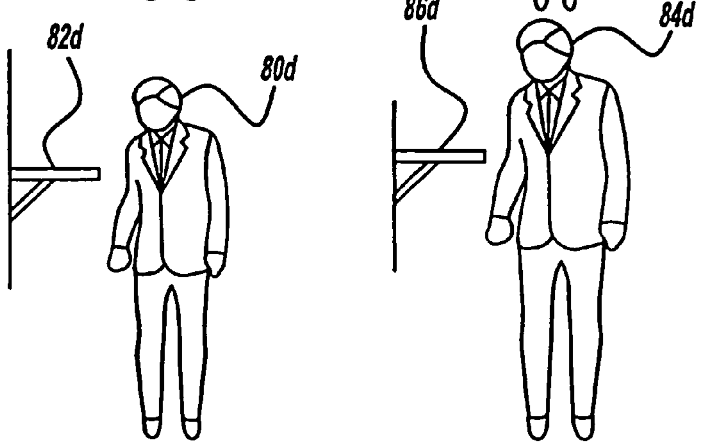

As shown in FIG. 3A, in a 1:1 scale, a physical human **80*a* views the physical environment, which in this example is a shelf 82*a*, from the same perspective as a virtual human 84*a* immersed within a virtual environment 86*a*. Advantageously, a 1:1 scale perspective allows the evaluator 32 to apply their individual experiences to the digital vehicle 41 represented in the virtual world. FIG. 3B illustrates a 1:1 scale with the shelf 82*b* positioned lower. Like reference numbers are used for like parts in FIG. 3A. As shown in FIG. 3C, for a 1:.9 scale, an evaluator 80*c* experiences the virtual environment of a shelf 86*c* from the perspective of a virtual human 84*c* one tenth shorter than the actual size of the evaluator 80*c*. It should be appreciated that the shelf 86*c* moves upwards in a vertical direction to simulate the perception of a shorter individual. As shown in FIG. 3D for a 1:1.1 scale, the evaluator 80*c* experiences a virtual environment 86*d* from the perspective of a virtual human 84*d* one tenth taller than the actual size of the evaluator 80***d*. Likewise, the shelf 86*d* moves downwards in a vertical direction to simulate the perception of a taller individual. The methodology advances to block 135.

In block 135, the design team 62 measures the evaluator's 32 key anthropometric dimensions for the specified study. The anthropometric dimensions, as is understood in the art, are ergonomically recognized dimensions identified by ergonomic experts and used to relate the sizes of various members of a target population. Examples of anthropometric dimensions includes height, seated eye height, arm length, leg length and knee to hip length. The methodology advances to block 140 and continues.

In block 140, the methodology determines a scale ratio for the evaluator 32 based on the scale perspective, a selected anthropometric dimension of the evaluator 32 and a similar anthropometric dimension of the target population. The methodology advances to block 145 and the prop 145 is adjusted based on the scale ratio for the evaluator 32. Advantageously, the evaluator experiences the prop from the point of view of an individual the size of the scale perspective. The methodology advances to block 147.

In block 147, the methodology creates or "grows" the virtual human 36 based on the scale ratio and the anthropometric dimensions of the evaluator 32. The virtual human 36 is grown by creating a virtual human 36 the same size as the evaluator 32. For example, a human measuring device such as an anthropometer may be used. However, this process is time consuming. Advantageously, the virtual human 36 can also be grown using a digital process, as described in FIG. 5. The methodology advances to block 150.

Figure 5:
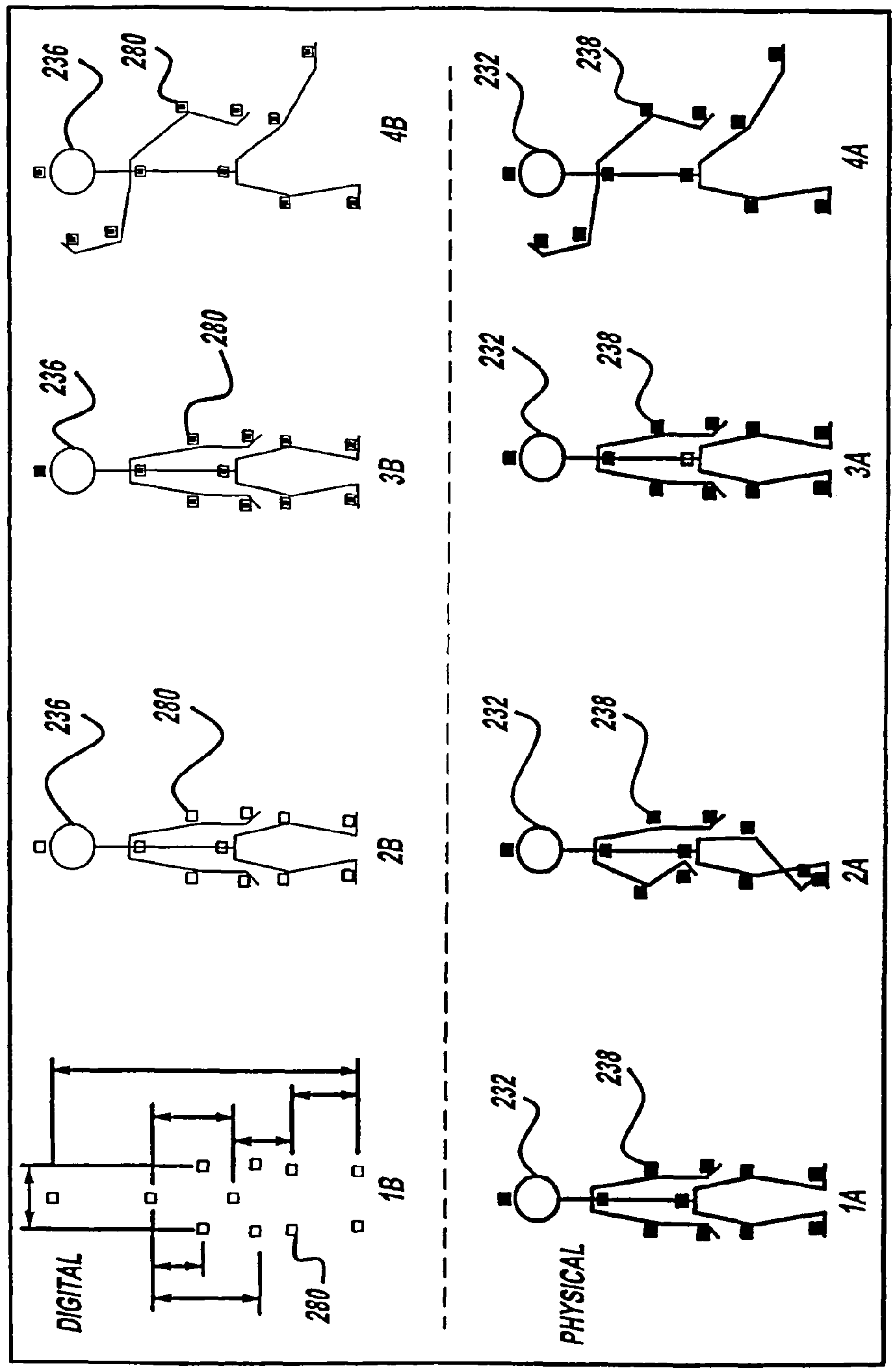
FIG. 5 is a flowchart of a process for growing a digital human and constraining the digital human to the evaluator, according to the present invention, for the method of FIG. 2.

In block 150, the methodology registers the virtual environment 42 to the physical environment including the prop 12, the virtual human 36 to the evaluator 32 and the virtual human 36 in the virtual environment 42 as described in FIG. 5. For example, to align the virtual and physical environments, three repeatable markers are located in each environment. The position and orientation of these markers are aligned to register the environments. For example, to align the virtual human 36 in the virtual environment 42, key reference points are selected. An example of a key reference point is the H-point 22, to locate the virtual human 36 within a seat in the digital vehicle 41 in the virtual environment 42. Another example of a key reference point is a ground plane (not shown), and the virtual human 36 is located by registering the digital feet to the ground plane. The methodology advances to block 155.

In block 155, the evaluator 32 is immersed in the virtual environment 42. The positioning of the evaluator 32 relative to the prop 12 is based on a predetermined reference point. For example, the hip point 22 is used to locate the hip center of the evaluator 32 while seated in the seat 14. For a standing or walking study outside the vehicle, the virtual human 36 is located by registering the digital feet to a ground plane. Advantageously, the evaluator 32 sees the view of the virtual environment 42 through the virtual human's eye. The evaluator 32 can control a movement of the virtual human 36 through their own movements, as captured by the full-body motion capture system. It should be appreciated that the steps of preparing the evaluator 32, prop 12, and digital vehicle, and growing the virtual human 36 and registering with the physical and virtual environments need not be accomplished in the order shown in FIG. 2, but can be done in another order including concurrently. The methodology advances to block 160.

In block 160, the evaluation is performed by the user 54, design team 64 and evaluator 32. An example of an evaluation is a visibility study that evaluates various pillar 68 design alternatives for the digital vehicle to determine which trim design would yield optimum exterior visibility. Another example of an evaluation is a vehicle interior visibility study to assess visual obscuration of an instrument panel display (not shown). A further example of an evaluation is a reach study that considers the accessibility and positioning of controls on the instrument panel. The evaluation typically includes questions or instructions from the design team 64 or user 54 that request the evaluator 32 to perform an activity, such as look out a side window (not shown) for the visibility study or reach for a radio control knob (not shown) for the reach study. It should be appreciated that real time collision detection can be used in the study. For example, a reach study of the virtual radio control knob may include a collision detection mechanism (not shown) as is understood in the art, to alert the evaluator 32 that contact has been made. The evaluation may also ask for and record the evaluator's opinions and comments about the vehicle design.

The design team 64 may observe the evaluation by viewing the remote video terminals 62 and participating through interactive questioning of the evaluator 32 during the course of the evaluation. Advantageously, the design team 64 can dynamically modify the study or their view of the study, based on their real-time observations. For example, the design team 64 may ask a question regarding comfort. The design team 64 can also observe other factors, such as an interference with or clearance to a portion of the vehicle. For example, clearance between the top of the virtual human's head and a header portion of the vehicle can be observed. The performance of the study, including the movements and view of the evaluator 32, can be recorded using a video recording mechanism (not shown) operatively connected to the computer system 46 as is known in the art, for further analysis by the design team. The methodology advances to diamond 165.

In diamond 165, the design team 64 determines whether to perform another evaluation. If the design team 64 determines to perform another evaluation, the methodology advances to diamond 170 and determines if the new evaluation will be performed with a new evaluator 32. If the new evaluation will be performed with a new evaluator 32, the methodology returns to block 125 and continues. Returning to diamond 170, if the design team 64 determines not to perform the new study with a new evaluator 32, the methodology advances to diamond 175.

In diamond 175, the design team 64 determines whether to revise the scale ratio. If the design team determines not to revise the scale ratio, the methodology returns to block 160. Returning to diamond 175, if the design team 64 determines to revise the scale ratio, the methodology advances to diamond 180. In diamond 180, the design team 64 determines whether to use different key anthropometric dimensions for either the study or the evaluator 32. If the design team determines to use different predetermined anthropometric dimension for the evaluator 32, the methodology returns to block 135 and continues. Returning to diamond 180, if the design team 64 determines not to use different anthropometric dimensions, the methodology returns to block 130.

Returning to diamond 165, if the design team 64 determines not to perform another study, the methodology advances to block 185. In block 185, the study is made available to the design team 64 for further review and analysis. For example, the design team 64 may publish the results of the study, including results of the questionnaire and the recorded motions, for use by others. The design team 64 may also recommend a change to the vehicle design based on the results of the study. The methodology advances to block 190 and ends.

Referring to FIG. 5, a process for digitally growing a virtual human 236 and constraining the virtual human 236 to the evaluator for use by the previously described method is illustrated. The process begins in step la, with an evaluator 232 assuming an initial posture that is static, repeatable and robust. An example of an initialization posture is standing with feet a shoulder width apart, hands and arms by side and head looking straight ahead. It should be appreciated that the evaluator 232 has strategically placed motion capture sensors 238 as previously described. In step 1*b*, concurrent with step 1*a*, the computer system 46 uses a signal from the motion capture sensors 238 on the evaluator 232 to digitally establish the motion capture sensor locations for the virtual human 236, as shown at 280. Critical dimensions between the sensors 238 may also be measured, such as height, elbow width, leg length, or knee to ankle length.

In step 2*a*, the evaluator 232 relaxes, while concurrently in step 2*b* the computer system 46 digitally creates a virtual human 236 in space, based on the measurements between the motion capture sensors 238 and dimensions from the evaluator 232, including weight, height and limb lengths. It should be appreciated that in this example, the virtual human 236 is modeled after the Jack human model, as is known in the art. The Jack human model is a full-body, real-time interactive model of a human that has realistic joint constraints, behavior models and an inverse kinematic engine that provides real time solutions. These characteristics render the Jack human model of the digitally created virtual human 236 fully controllable in real-time, and minimizes the number of motion capture sensors 238 worn by the evaluator 232. The Jack human model uses realistic joint constraints and spine behavior model so that movement of the virtual human's spine can be sufficiently controlled by two motion capture sensors 238.

To digitally grow the virtual human 236, the motion sensor locations on the anthropometric landmarks of the evaluator 232 and corresponding sites on the virtual human 236 are used. Stature is obtained by using vertical difference equations, and the girth of the digital human 236 is calculated by applying the horizontal distance between an elbow motion capture sensor 238 and the evaluator's weight. The resulting virtual human 236 has the height, limb length and limb proportions of the evaluator 232. The virtual human 236 can be modified for a scaled study by applying the scale ratio. Advantageously, the scaled virtual human 236 has similar limb proportions to the physical human evaluator 232 represented by the scaled perspective.

In step 3*a*, the evaluator 232 reassumes the initial posture from step 1*a* to align the virtual human 236 to the evaluator 232. In step 3*b*, concurrent with step 3*a*, the virtual human 236 is aligned with the evaluator 232, so that the virtual human 236 and evaluator 232 have the same posture in the virtual and physical environments. Constraints are established to relate the motion capture sensors 238 on the evaluator 232 with the digital sensor locations 280. Thus, the constraints force the digital sensor locations 280 to follow the motion capture sensors 238.

In step 4*a*, the evaluator 232 moves. Concurrently, in step 4*b* the virtual human 236 mirrors the evaluator's movements. The constraints force the digital sensor locations 280 to mirror the position of the motion capture sensors 238 worn by the evaluator 232. Advantageously, the full body of the evaluation 232 is digitally represented by the virtual human 236 in the virtual environment 42, and the motions of the evaluator 232 are digitally represented by the virtual human 236 in the virtual environment 42.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system for subjective evaluation of a vehicle design within a virtual environment using virtual reality comprising:

a scaleable physical property representative of the vehicle design, wherein the physical property is adjusted according to a scale ratio for an evaluator of the vehicle design, wherein the scale ratio is a ratio between a predetermined dimension of the evaluator and a predetermined dimension of a member of a target population;

a computer system for digitally creating a virtual environment having a virtual human immersed within the virtual environment, wherein the virtual environment includes the vehicle design and the virtual human virtually represents a scaled evaluator;

a motion capture system for sensing a motion of the evaluator and communicating the sensed motion of the evaluator to the computer system, so that the motion of the evaluator controls the motion of the virtual human in the virtual environment; and a virtual reality display mechanism operatively communicating with the computer system, for providing the evaluator a view of the virtual environment while evaluating the vehicle design.

2. The system of claim 1 wherein the motion capture system includes an instrumented glove worn by the evaluator for sensing motion of the evaluator's hand.

3. The system of claim 1 wherein the motion capture system includes magnetic spatial tracking sensors located on the evaluator for sensing motion of the evaluator's full body.

4. The system of claim 1 wherein the virtual reality display mechanism includes a head mounted display mechanism worn by the evaluator for seeing the virtual environment through an eye of the virtual human.

5. The system of claim 1 wherein the computer system includes at least one video terminal displaying a view of the virtual environment as seen through an eye of the virtual human.

6. The system of claim 1 wherein the computer system includes at least one video terminal displaying a third person view of the virtual human immersed within the virtual environment.

7. A method of subjective evaluation of a vehicle design within a virtual environment using virtual reality, said method comprising the steps of:

preparing an evaluator of a vehicle design for immersion as a virtual human in the virtual environment, wherein the virtual environment is created within a computer system and includes the vehicle design;

determining a scale ratio and range of a target population for the evaluator, wherein the scale ratio is a ratio between a predetermined dimension of the evaluator and a predetermined dimension of a member of the target population;

preparing an adjustable property using the vehicle design and the scale ratio;

growing the virtual human within the virtual environment to virtually represent a scaled evaluator;

aligning the virtual human in the virtual environment with the evaluator and the property, performing the evaluation of the vehicle design by the evaluator; and using the evaluation of the vehicle design in the design of the vehicle.

8. A method as set forth in claim 7 wherein said step of preparing an evaluator includes the step of measuring an anthropometric dimension of the evaluator.

9. A method as set forth in claim 7 wherein said step of preparing an evaluator includes the step of positioning a motion capture system on the evaluator for sensing a motion of the evaluator and communicating the sensed motion of the evaluator to the computer system, so that the motion of the evaluator controls the motion of the virtual human in the virtual environment.

10. A method as set forth in claim 7 wherein said step of preparing an evaluator includes providing the evaluator with a virtual reality display mechanism operatively communicating with the computer system, for providing the evaluator a view of the virtual environment while evaluating the vehicle design.

11. A method as set forth in claim 7 wherein the step of preparing an adjustable property includes the step of determining a scale ratio range for a member of a target population represented in the evaluation and using the scale ratio range to determine adjustability of the property.

12. A method as set forth in claim 7 including the step of determining whether to perform a new evaluation and performing a new evaluation if determined to perform a new evaluation.

13. A method as set forth in claim 7 wherein said step of growing the virtual human includes the steps of:

assuming an initial posture by the evaluator;

digitally establishing locations of motion capture sensors positioned on the evaluator in the initial posture using a computer system;

creating a virtual human digitally to represent the evaluator using the digital motion capture sensor locations for the virtual human, the evaluator's measurements and the scale ratio;

aligning the virtual human with the evaluator, wherein the motion capture sensor locations on the virtual human are aligned with the motion capture sensor locations on the evaluator; and checking that the motion of the virtual human mirrors the motion of the evaluator.

14. A method of subjective evaluation of a vehicle design within a virtual environment using virtual reality, said method comprising the steps of:

preparing an adjustable property to represent the vehicle design;

measuring the evaluator;

positioning a full-body motion capture system on an evaluator for sensing a motion of the evaluator and communicating the sensed motion of the evaluator to a computer system, so that the motion of the evaluator controls the motion of the virtual human in the virtual environment;

providing the evaluator with a virtual reality display mechanism operatively communicating with the computer system, for providing the evaluator a view of the virtual environment while evaluating the vehicle design determining a scale ratio and range of a target population for the evaluator wherein the scale ratio is a ratio between a predetermined dimension of the evaluator and a predetermined dimension of a member of the target population;

adjusting the property using the scale ratio for the evaluator;

growing the virtual human in the virtual environment using the measurements of the evaluator and the scale ratio to virtually represent a scaled evaluator;

aligning the virtual human in the virtual environment to the evaluator and the property;

performing the evaluation of the vehicle design by the evaluator; and using the evaluation of the vehicle design in the design of the vehicle.

15. A method as set forth in claim 14, including the step of determining whether to perform a new evaluation and performing a new evaluation if determined to perform a new evaluation.

16. A method as set forth in claim 15 including the step of determining whether to use a new evaluator and using a new evaluator if determined to use a new evaluator.

17. A method as set forth in claim 16 including the step of determining whether to revise the scale ratio if determined not to use a new evaluator and revising the scale ratio if determined to revise the scale ratio.

18. A method as set forth in claim 14 wherein said step of growing the virtual human includes the steps of:

assuming an initial posture by the evaluator;

digitally establishing locations of motion capture sensors positioned on the evaluator in the initial posture using a computer system;

creating a virtual human digitally using the motion capture sensor locations for the virtual human and the scaled measurements of the evaluator;

aligning the virtual human with the evaluator, wherein the motion capture sensor locations on the virtual human are aligned with the motion capture sensor locations on the evaluator; and checking that the motion of the virtual human mirrors the motion of the evaluator.

19. A method as set forth in claim 14, including the step of determining a scale ratio range for a member of a target population represented in the evaluation and using the scale ratio range to determine adjustability of the property.

* * * * *